United States Patent
Xie et al.

(10) Patent No.: US 10,134,269 B2
(45) Date of Patent: Nov. 20, 2018

(54) CONTROL SWITCHING METHOD AND CONTROL TERMINAL, AND STORAGE MEDIUM

(71) Applicant: Beijing Xiaomi Mobile Software Co., Ltd., Haidian District, Beijing (CN)

(72) Inventors: Yan Xie, Beijing (CN); Yueyue Chu, Beijing (CN); Qiqi Cui, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 15/479,039

(22) Filed: Apr. 4, 2017

(65) Prior Publication Data
US 2017/0365162 A1    Dec. 21, 2017

(30) Foreign Application Priority Data
Jun. 21, 2016    (CN) .......................... 2016 1 0454865

(51) Int. Cl.
  *G08C 17/02*    (2006.01)
  *H04W 76/10*    (2018.01)
  (Continued)

(52) U.S. Cl.
  CPC ............ *G08C 17/02* (2013.01); *B62K 11/007* (2016.11); *G05D 1/00* (2013.01); *G06F 21/604* (2013.01);
  (Continued)

(58) Field of Classification Search
  CPC .......................... G08C 17/02; G08C 2201/91; G08C 2201/93; H04W 76/10; H04W 4/02;
  (Continued)

(56) References Cited

U.S. PATENT DOCUMENTS 7,653,465 B1 *   1/2010  Geiger ................... B61L 3/127
                                                      701/19
9,545,935 B2 *   1/2017  Liberatore ............. B61L 3/127
(Continued)

FOREIGN PATENT DOCUMENTS

CN    202694152 A    1/2013
CN    103942940 A    7/2014
(Continued)

OTHER PUBLICATIONS

International Search Report issued in corresponding International Application No. PCT/CN2016/098260, dated Mar. 16, 2017, 11 pages.
(Continued)

*Primary Examiner* — Brian Miller
(74) *Attorney, Agent, or Firm* — Arch & Lake LLP

(57) ABSTRACT

Methods, devices, and storage mediums are provided for switch control. The method may include at least the following: sending a request for controlling the controlled device to a server, where the request instructs the server to request a first control terminal to transfer control of the controlled device to the mobile terminal; receiving a notification, sent by the server, of agreeing to control the controlled device, wherein the notification is sent after the server determines that the first control terminal agrees to transfer control; and communicating with the controlled device to control the controlled device.

20 Claims, 13 Drawing Sheets

(51) Int. Cl.

| | | |
|---|---|---|
| *H04W 4/02* | (2018.01) | |
| *G05D 1/00* | (2006.01) | |
| *H04W 4/04* | (2009.01) | |
| *B62K 11/00* | (2006.01) | |
| *G06F 21/60* | (2013.01) | |
| *G06F 21/62* | (2013.01) | |
| *H04W 76/20* | (2018.01) | |
| *H04W 4/80* | (2018.01) | |
| *H04W 12/08* | (2009.01) | |

(52) U.S. Cl.
CPC .......... *G06F 21/6209* (2013.01); *H04W 4/02* (2013.01); *H04W 4/046* (2013.01); *H04W 76/10* (2018.02); *G06F 2221/2101* (2013.01); *G06F 2221/2141* (2013.01); *G08C 2201/91* (2013.01); *G08C 2201/93* (2013.01); *H04W 4/80* (2018.02); *H04W 12/08* (2013.01); *H04W 76/20* (2018.02)

(58) Field of Classification Search
CPC ..... H04W 4/046; H04W 76/02; H04W 76/20; H04W 4/80; H04W 4/008; H04W 76/04; H04W 12/08; G05D 1/00; B62K 11/007
See application file for complete search history.

(56) References Cited

U.S. PATENT DOCUMENTS

| | | | | |
|---|---|---|---|---|
| 2007/0001058 | A1* | 1/2007 | Severson | ............... A63H 19/24 246/1 R |
| 2009/0248220 | A1 | 1/2009 | Ecton et al. | |
| 2011/0118913 | A1* | 5/2011 | Pretorius | ............. B61L 27/0088 701/19 |
| 2011/0245998 | A1 | 10/2011 | Ecton et al. | |
| 2011/0251737 | A1 | 10/2011 | Ecton et al. | |
| 2011/0251738 | A1 | 10/2011 | Ecton et al. | |
| 2011/0313596 | A1 | 12/2011 | Ecton et al. | |
| 2014/0081512 | A1* | 3/2014 | Fugiel | ...................... B60T 7/16 701/33.2 |
| 2014/0111321 | A1* | 4/2014 | Fox | ........................ G08C 17/02 340/12.54 |
| 2014/0142868 | A1* | 5/2014 | Bidaud | ............. G01N 21/8803 702/40 |
| 2014/0263856 | A1* | 9/2014 | Hann | ........................ B61L 7/06 246/3 |
| 2016/0082988 | A1* | 3/2016 | Kurz | .................. B61L 15/0072 701/19 |
| 2016/0318530 | A1* | 11/2016 | Johnson | .................. B61L 23/04 |
| 2017/0217462 | A1* | 8/2017 | West | ...................... B61L 27/0077 |

FOREIGN PATENT DOCUMENTS

| | | |
|---|---|---|
| CN | 104702386 A | 6/2015 |
| CN | 105261189 A | 1/2016 |
| CN | 105334863 A | 2/2016 |
| CN | 105955295 E | 9/2016 |
| CN | 106102110 A | 11/2016 |
| JP | 2011150470 A | 8/2011 |

OTHER PUBLICATIONS

Extended European search report issued in corresponding European Application No. 17153163.5, dated Aug. 9, 2017, 7 pages.
First Office Action issued in corresponding Chinese Application No. 201610454865.4, dated Dec. 20, 2017, 7 pages.

* cited by examiner

CONTROL SWITCHING METHOD AND CONTROL TERMINAL, AND STORAGE MEDIUM

CROSS-REFERENCE TO RELATED APPLICATION

This application is based on and claims the priority of the Chinese patent application No. CN201610454865.4, filed on Jun. 21, 2016, which is incorporated herein by reference in its entirety.

TECHNICAL FIELD

The present disclosure relates to the field of control technology, and more particularly to methods, control terminals, and storage mediums for switching control.

BACKGROUND

With the development of technologies, control terminals have been able to control such controlled devices as drones and balance vehicles via wireless signals. In related arts, a control terminal connects communicatively with a controlled device and sends control instructions to the controlled device to control the controlled device. Generally, if it is inconvenient for the control terminal to continue controlling the controlled device, operation of the controlled device has to be interrupted, which adversely affects the user experience.

SUMMARY

Embodiments of the present disclosure provide a control switching method, a control terminal, and a storage medium as follows.

According to a first aspect of the present disclosure, there is provided a control switching method including: sending a request for controlling a controlled device to a server, where the request instructs the server to request a first control terminal to transfer control of the controlled device to a second control terminal; receiving a notification, sent by the server, of agreeing to control the controlled device, where the notification is sent after the server determines that the first control terminal agrees to transfer control. The second control device communicate with the controlled device to control the controlled device.

According to a second aspect of the present disclosure, there is provided a control switching method. During a process of controlling a controlled device, a first control terminal receives a request, sent by a server, for transferring control of the controlled device, where the request for transferring control of the controlled device is sent by the server after the server receives a request, sent by a second control terminal, for controlling the controlled device. The first control terminal may send to the server a notification of agreeing to transfer control, so that the server notifies the second control terminal to establish a communication connection with the controlled device. The first control terminal may send to the controlled device an instruction of connecting with the second control terminal, so that the controlled device, after receiving the instruction, establishes a communication connection with the second control terminal and receives a control instruction sent by the second control terminal.

According to a third aspect of the present disclosure, there is provided a control terminal. The control terminal may include: a sending module configured to send a request for controlling a controlled device to a server, wherein the server, after receiving the request, requests a first control terminal, which controls the controlled device at present, to transfer control; a receiving module configured to receive a notification, sent by the server, of agreeing to control the controlled device, wherein the notification is sent after the server determines that the first control terminal agrees to transfer control; and a control module configured to connect communicatively with the controlled device so as to control the controlled device.

According to a fourth aspect of the present disclosure, there is provided a control terminal which may include: a receiving module configured to, during a process of controlling a controlled device, receive a request, sent by a server, for transferring control of the controlled device, wherein the request for transferring control of the controlled device is sent by the server after the server receives a request, sent by a second control terminal, for controlling the controlled device; a first sending module configured to send to the server a notification of agreeing to transfer control, so that the server notifies the second control terminal to establish a communication connection with the controlled device; and a second sending module configured to send to the controlled device an instruction of connecting with the second control terminal, so that the controlled device, after receiving the instruction, establishes a communication connection with the second control terminal and receives a control instruction sent by the second control terminal.

According to a fifth aspect of the present disclosure, there is provided a control terminal which may include: a processor; and a memory configured to store instructions executable by the processor. The processor is configured to: send a request for controlling a controlled device to a server, wherein the server, after receiving the request, requests a first control terminal, which controls the controlled device at present, to transfer control; receive a notification, sent by the server, of agreeing to control the controlled device, wherein the notification is sent after the server determines that the first control terminal agrees to transfer control; and connecting communicatively with the controlled device to control the controlled device.

According to a sixth aspect of the present disclosure, there is provided a control terminal which may include: a processor; and a memory configured to store instructions executable by the processor. The processor is configured to: during a process of controlling a controlled device, receive a request, sent by a server, for transferring control of the controlled device, where the request for transferring control of the controlled device is sent by the server after the server receives a request, sent by a second control terminal, for controlling the controlled device; send to the server a notification of agreeing to transfer control, so that the server notifies the second control terminal to establish a communication connection with the controlled device; and send to the controlled device an instruction of connecting with the second control terminal, so that the controlled device, after receiving the instruction, establishes a communication connection with the second control terminal and receives a control instruction sent by the second control terminal.

According to a seventh aspect of the present disclosure, there is provided a non-transitory computer-readable storage medium having stored therein instructions that, when executed by a processor of a mobile terminal, causes the mobile terminal to perform acts including: sending a request for controlling a controlled device to a server, wherein the server, after receiving the request, requests a first control terminal, which controls the controlled device at present, to transfer control; receiving a notification, sent by the server, of agreeing to control the controlled device, wherein the notification is sent after the server determines that the first control terminal agrees to transfer control; and connecting communicatively with the controlled device to control the controlled device.

It should be understood that both the foregoing general description and the following detailed description are only exemplary and explanatory and are not restrictive of the present disclosure.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of example embodiments of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise indicated. The implementations set forth in the following description of exemplary embodiments do not represent all implementations consistent with the disclosure. Instead, they are merely examples of apparatuses and methods consistent with aspects related to the disclosure as recited in the appended claims.

With the development of technology, control terminals have been able to control such controlled devices as drones and balance vehicles via wireless signals. In related arts, a control terminal connects communicatively with a controlled device and sends control instructions to the controlled device to control the controlled device. In the embodiments of the present disclosure, by sending a request for controlling the controlled device to a server, receiving a notification sent by the server after a control terminal which controls the controlled device agrees to transfer control, and connecting communicatively with the controlled device to control the controlled device after receiving the notification, control of the controlled terminal may be switched.

The control terminal in the embodiments of the present disclosure may be a portable device with a wireless communication function, such as a controller, a handset, a tablet computer, or a wearable device. The controlled device in the embodiments of the present disclosure may be a device that can be controlled, such as a balance vehicle, a bike, a scooter, a toy, a car, or a drone.

Figure 1:
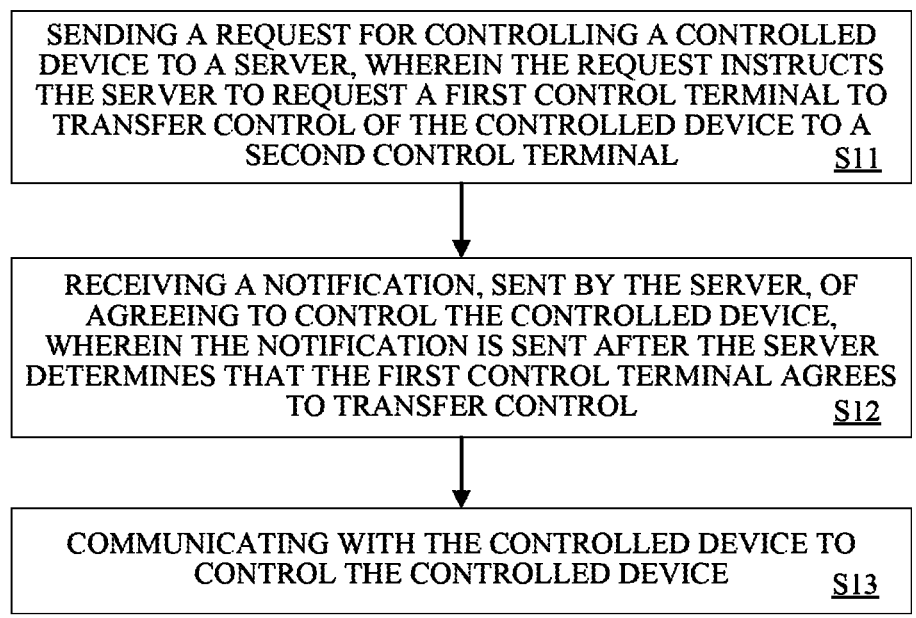
FIG. 1 is a flow chart showing a control switching method according to one or more embodiments.

FIG. 1 is a flow chart showing a control switching method according to one or more embodiments. The control switching method may be implemented in a control terminal which may be a portable device with a wireless communication function, such as a controller, a handset, a tablet computer or a wearable device. As shown in FIG. 1, the control switching method includes the following steps.

In step S11, a request for controlling a controlled device is sent to a server. The request instructs the server to request a first control terminal to transfer control of the controlled device to a second control terminal. After receiving the request, the server may request a first control terminal, which controls the controlled device at present, to transfer control to the second control terminal.

The server may be a device communicating with the controlled device and may be a computer terminal or the like. The controlled device may be a device that can be controlled, such as a self-balancing vehicle, a bike, a scooter, a toy, a car, or a drone.

In step S12, a notification, sent by the server, of agreeing to control the controlled device is received. The notification is sent after the server determines that the first control terminal agrees to transfer control.

The server can determine that the first control terminal agrees to transfer control, after receiving a notification, sent by the first control terminal, of agreeing to transfer control.

In step S13, the control terminal communicate with the controlled device to control the controlled device.

According to the control switching method provided by the embodiment of the present disclosure, by sending a request for controlling the controlled device to the server, receiving a notification sent by the server after the control terminal which controls the controlled device agrees to transfer control, and connecting communicatively with the controlled device to control the controlled device after receiving the notification, control of the controlled terminal may be switched. Accordingly, the control terminal may be changed without interrupting operation of the controlled device, thereby improving the user experience.

In an embodiment, the step S13 in which the control terminal connects communicatively with the controlled device includes: sending a connection request to the controlled device, so that the controlled device establishes a communication connection according to the connection request after receiving a connection instruction sent by the first control terminal.

In an embodiment, the first control terminal sends the connection instruction to the controlled device after agreeing to transfer control.

According to the control switching method provided by the embodiment of the present disclosure, by sending a connection request to the controlled device and establishing a communication connection with the controlled device after the controlled device receives a connection instruction, switching of the communication connection with the controlled device may be controlled.

In an embodiment, before the step S11 in which the request for controlling the controlled device is sent to the server, the control switching method further includes: determining a control region; and determining whether the controlled device is in the control region.

The control region is an area surrounding the control terminal, in which the control terminal can control the controlled device via an established communication. For example, the control region may be determined based on a range capable of being covered by signals. The control terminal may further determine the control region using other factors, which include but not limited to position information of the control terminal, local weather near the control terminal, topographic information in a region that covers the maximum possible control region, battery level of the control terminal, etc. The maximum possible control region may be obtained when the control terminal and the controlled device are in an almost perfect weather with no pollution and there is no natural or artificial obstacles between the control terminal and the controlled device. In other words, the maximum possible control region may be a theoretical value pre-calculated using a plurality of best presumptions with the least communication signal attenuation. The position information of the control terminal may include global positioning system (GPS) location information, address information, or other information indicating the location of the control terminal.

To determine whether the controlled device is in the control region, the control terminal may send a testing signal and then check whether there is any feedback signals from the controlled device. Alternatively or additionally, the control terminal may receive a broadcasting message from the controlled device including position information of the controlled device so that the control terminal may determine whether the controlled device is in the control region.

According to the control switching method provided by the present disclosure, after it is detected that the controlled device is located in the control region, the request for controlling the controlled device is initiated, thereby increasing the success rate of control switching because the controlled device is now located in the control region.

Here, the step S13 in which the controlled device is controlled includes: acquiring position information and status information of the controlled device; and controlling the controlled device according to the position information and the status information. The position information of the controlled device may include GPS location information, address information, or other information indicating the location of the controlled device.

In an embodiment, the position information and the status information of the controlled device may be acquired from the controlled device.

In an embodiment, when the controlled device sends the position information and the status information thereof to the server in real time, the position information and the status information of the controlled device may be acquired from the server.

According to the control switching method provided by the embodiment of the present disclosure, the controlled device may be accurately controlled according to the position information and the status information of the controlled device. Accordingly, it is possible to switch control among a plurality of control terminals without interrupting operation of the controlled device, thereby improving the user experience.

Figure 2:
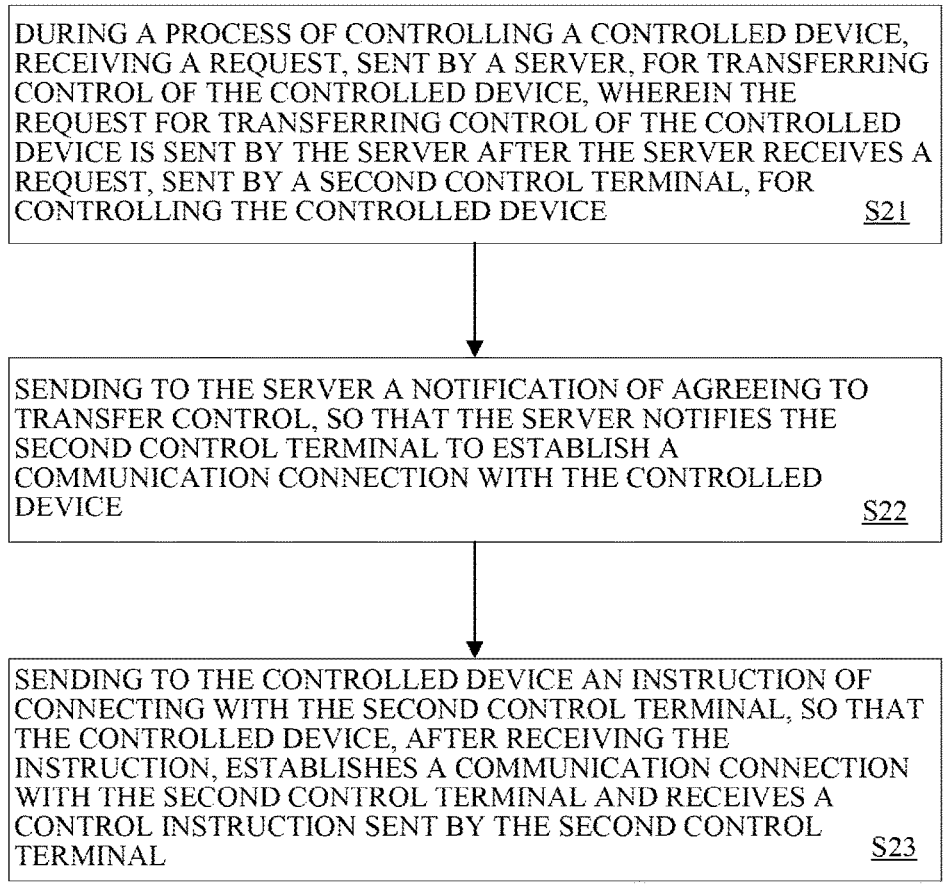
FIG. 2 is a first flow chart showing a control switching method according to one or more embodiments.

FIG. 2 is a flow chart showing a control switching method according to one or more embodiments. The control switching method may be implemented in a control terminal which may be a portable device with a wireless communication function, such as a controller, a handset, a tablet computer or a wearable device. As shown in FIG. 2, the control switching method includes the following steps.

In step S21, during a process of controlling a controlled device, a request, sent by a server, for transferring control of the controlled device is received. The request instructs the control terminal to transfer control of the controlled device to a second control terminal. The request for transferring control of the controlled device is sent by the server after the server receives a request, sent by a second control terminal, for controlling the controlled device.

In step S22, a notification of agreeing to transfer control is sent to the server, so that the server notifies the second control terminal to establish a communication connection with the controlled device.

In step S23, an instruction of connecting with the second control terminal is sent to the controlled device, so that the controlled device, after receiving the instruction, establishes a communication connection with the second control terminal and receives a control instruction sent by the second control terminal.

It should be understood that steps S22 and S23 may be executed in an arbitrary order. The order of steps S22 and S23 may be changed, and steps S22 and S23 may also be executed simultaneously.

According to the control switching method provided by the embodiment of the present disclosure, during the process of controlling the controlled device by a control terminal, the control device, in response to a request initiated by another control terminal for transferring control, sends a connection instruction to the controlled device after agreeing to transfer control. As such, a communication connection between the controlled device and the other control terminal may be established, making it convenient for the other control terminal to control the controlled device. Accordingly, the control terminal may be changed without interrupting operation of the controlled device, thereby improving the user experience.

Figure 3:
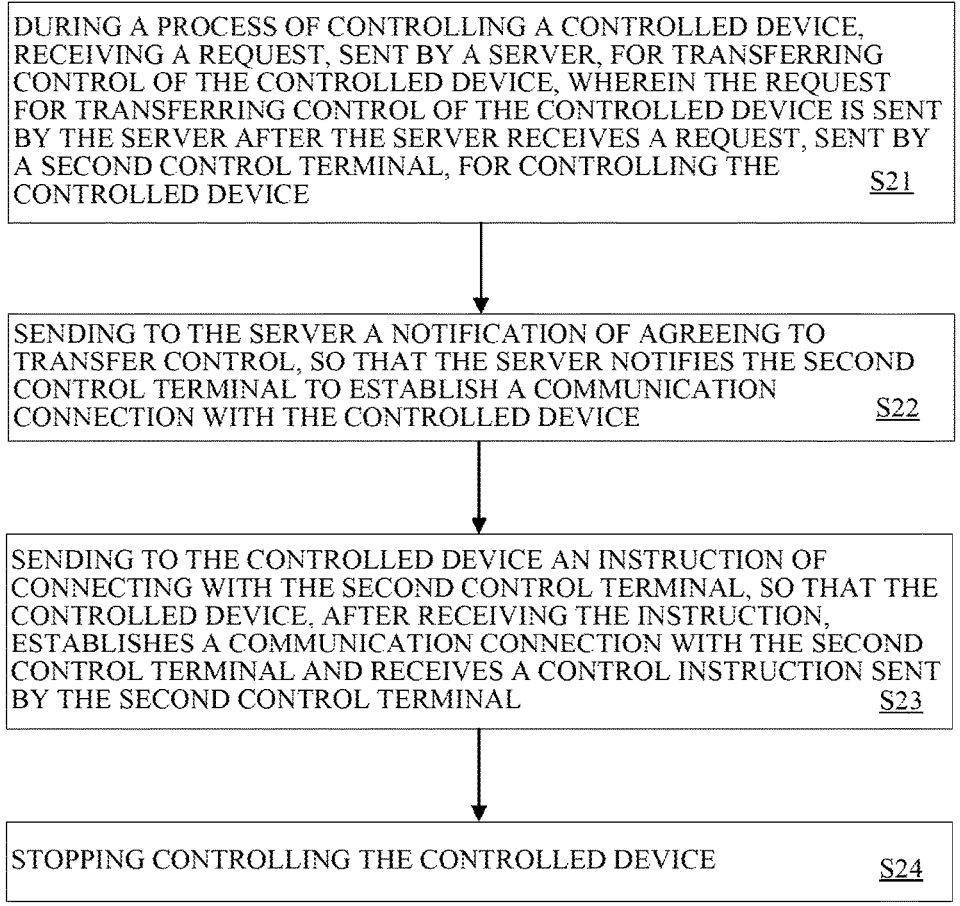
FIG. 3 is a second flow chart showing another control switching method according to one or more embodiments.

In an embodiment, as shown in FIG. 3, after the step S23 in which the instruction of connecting with the second control terminal is sent to the controlled device, the control switching method further includes: step S24 in which control of the controlled device is stopped.

According to the control switching method provided by the embodiment of the present disclosure, after the new control terminal and the controlled device are successfully connected to switch control to the new control terminal, control of the controlled device by the old control terminal is stopped, so that control is completely transferred to the new control terminal, thereby improving the experience of the user of the new control terminal.

Figure 4:
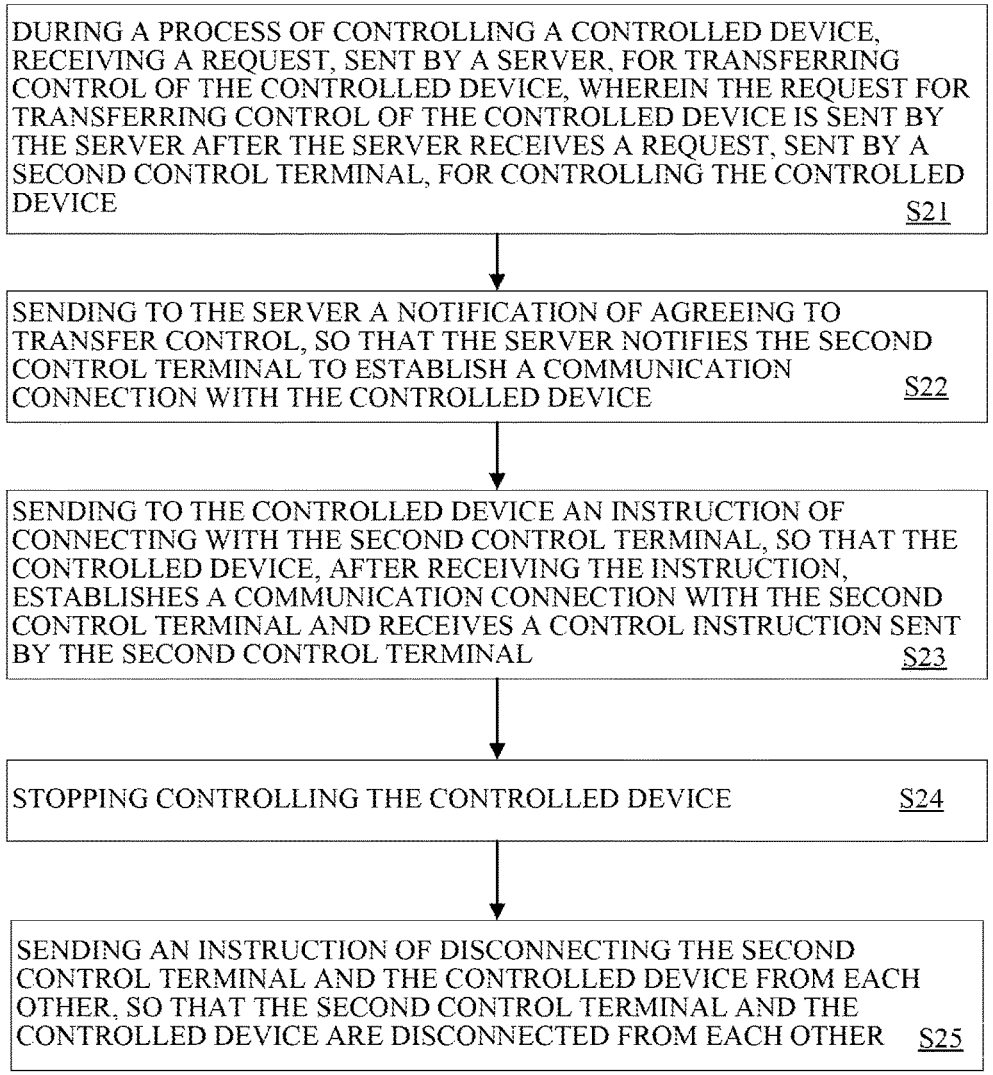
FIG. 4 is a third flow chart showing yet another control switching method according to one or more embodiments.

In an embodiment, as shown in FIG. 4, the control switching method further includes: step S25 in which an instruction of disconnecting the second control terminal and the controlled device from each other is sent, so that the second control terminal and the controlled device are disconnected from each other.

According to the control switching method provided by the embodiment of the present disclosure, by sending a disconnecting instruction to cut off the communication connection between the control terminal and the controlled device, the communication connection between the control terminal and the controlled device may be cut off as required, thereby improving the user experience. Accordingly, the control terminal may be changed without interrupting operation of the controlled device, thereby improving the user experience.

By using the control switching methods provided by the above embodiments of the present disclosure, this embodiment describes a specific application scenario in detail. The scenario provided by the embodiment is that: the control switching methods provided by the embodiments of the present disclosure are applied in handsets, the controlled device is a balance vehicle, and control of the balance vehicle is switched from a handset A to a handset B.

Figure 5:
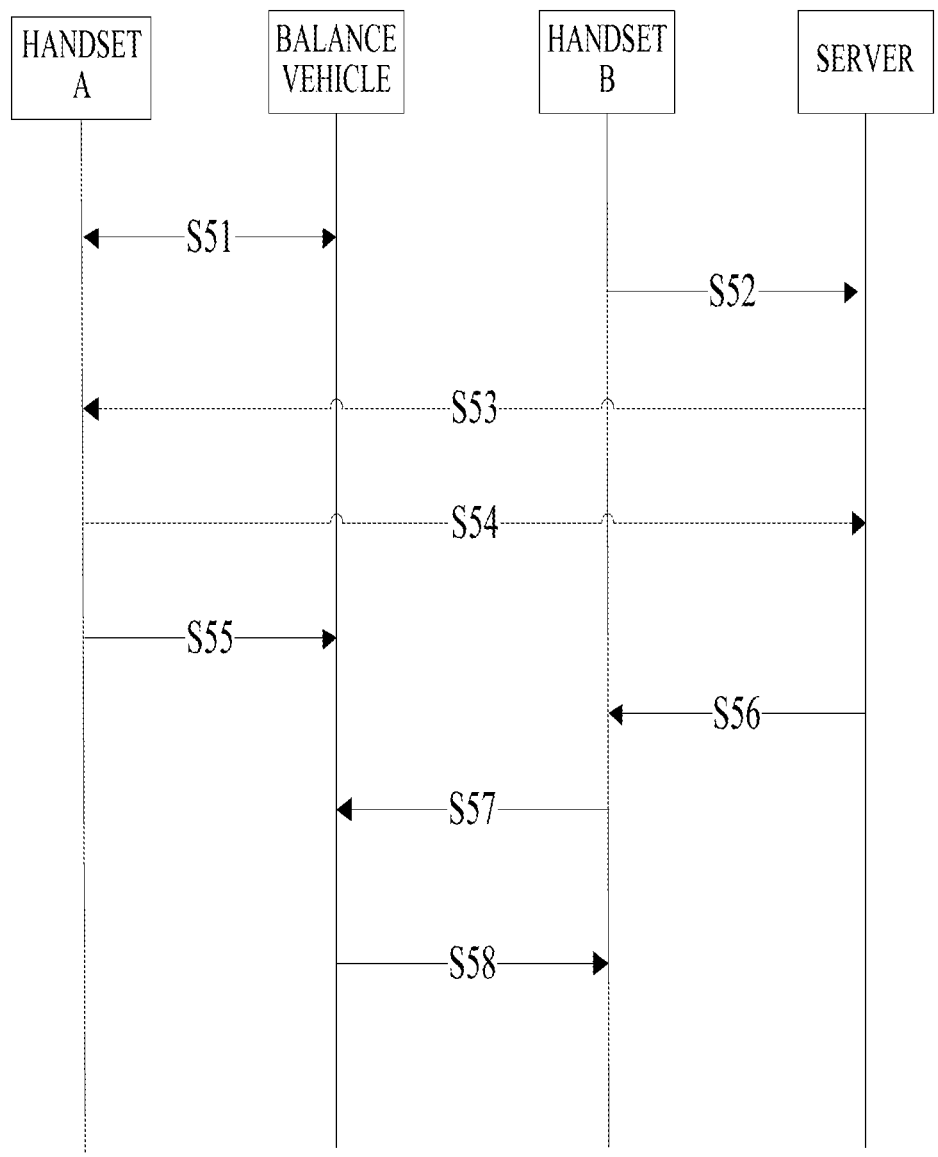
FIG. 5 is a flow chart showing a control switching method according to one or more embodiments.

As shown in FIG. 5, the control switching method provided by the embodiment includes the following steps.

In step S51, the handset A is in communicative connection with the balance vehicle and controls the balance vehicle.

In this embodiment, during the process for the handset A to control the balance vehicle, the balance vehicle can send position information and status information thereof to a server in real time. The server may be a device which communicates with the controlled device, such as a computer terminal.

In this embodiment, a locating module may be built in the balance vehicle. The position information is obtained via the locating module. The status information may comprise the vehicle's speed, electric quantity, posture, etc.

In step S52, when detecting that the balance vehicle is in a control region, the handset B sends a request for controlling the balance vehicle to the server.

In this embodiment, the handset B can detect whether the balance vehicle is in the control region in various manners. For example, it is detected that the balance vehicle is in the control region, by sensing a signal sent by the balance vehicle. As another example, the position of the balance vehicle is acquired from the server, and it is determined that the balance vehicle is in the control region based on the position of the balance vehicle.

In step S53, after receiving the request for controlling the balance vehicle, the server sends, to the handset A, a request for controlling the balance vehicle by the handset B.

In step S54, the handset A returns to the server a notification of agreeing that the mobile phone B controls the balance vehicle, after receiving the request for controlling the balance vehicle by the handset B.

In step S55, the handset A sends to the balance vehicle an instruction of connecting with the handset B.

In step S56, the server sends a notification of agreeing to control the balance vehicle to the handset B.

In step S57, the handset B sends a connection request to the balance vehicle, after receiving the notification of agreeing to control the balance vehicle.

In step S58, after receiving the connection request, the balance vehicle establishes a communication connection with the handset B and is controlled by the handset B.

Up to now, control of the balance vehicle is switched from the handset A to the handset B.

In this embodiment, after the communication connection between the handset B and the balance vehicle is established, the handset A can stop controlling the balance vehicle while the handset B independently controls the balance vehicle, so that control is transferred.

In this embodiment, during the process for the handset B to control the balance vehicle, the handset A can send, to the handset B and the balance vehicle simultaneously, an instruction of stopping control of the balance vehicle by the handset B to stop control of the balance vehicle by the handset B. The instruction of stopping control of the balance vehicle by the handset B may be sent by the handset A to the handset B via the server and may also be directly sent from the handset A to the handset B.

In this embodiment, the handset A can re-establish a communication connection with the balance vehicle to continue to control the balance vehicle, after sending the instruction of stopping control of the balance vehicle by the handset B.

According to the control switching method provided by the embodiment of the present disclosure, when detecting that the balance vehicle is in the control region, the handset sends the request for switching control, so as to obtain control of the balance vehicle.

By sending a request for controlling the controlled device to the server, receiving a notification sent by the server after the control terminal which controls the controlled device agrees to transfer control, and connecting communicatively with the controlled device to control the controlled device after receiving the notification, control of the controlled terminal may be switched.

According to the control switching method provided by the embodiment, when it is inconvenient for the handset A to control the balance vehicle (for example, the handset A has an insufficient electricity), control of the balance vehicle may be transferred to the handset B, without interrupting control of the balance vehicle.

According to the control switching method provided by the embodiment, before the balance vehicle moves beyond the distance within which it is connectable with the handset A, control of the balance vehicle is switched to the handset B distant from handset A, so that the distance for controlling the balance vehicle is lengthened.

Figure 6:
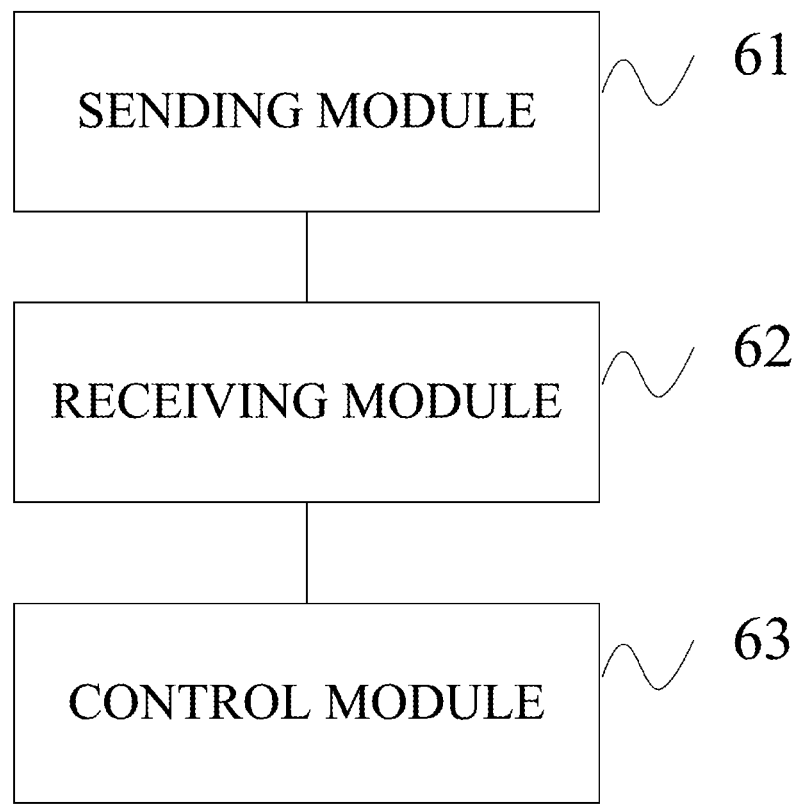
FIG. 6 is a first block diagram showing a control terminal according to one or more embodiments.

FIG. 6 shows a control terminal according to one or more embodiments. As shown in FIG. 6, the control terminal includes: a sending module 61, a receiving module 62 and a control module 63.

The sending module 61 is configured to send a request for controlling a controlled device to a server, wherein the server, after receiving the request, requests a first control terminal, which controls the controlled device at present, to transfer control.

The receiving module 62 is configured to receive a notification, sent by the server, of agreeing to control the controlled device, wherein the notification is sent after the server determines that the first control terminal agrees to transfer control.

The control module 63 is configured to connect communicatively with the controlled device so as to control the controlled device.

Figure 7:
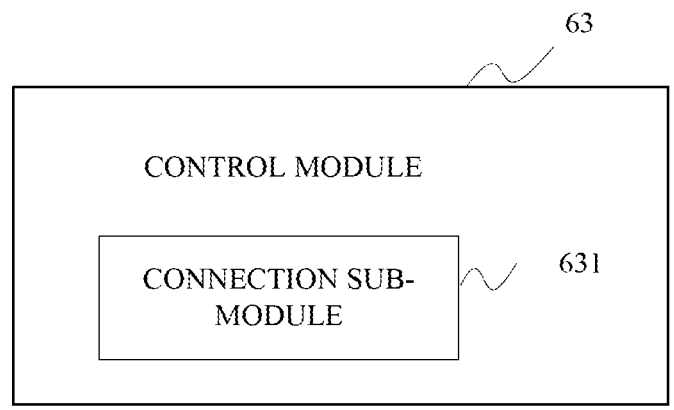
FIG. 7 is a second block diagram showing the control terminal of one or more embodiments.

As shown in FIG. 7, the control module 63 may include: a connection sub-module 631 configured to send a connection request to the controlled device, so that the controlled device establishes a communication connection according to the connection request after receiving a connection instruction sent by the first control terminal.

Figure 8:
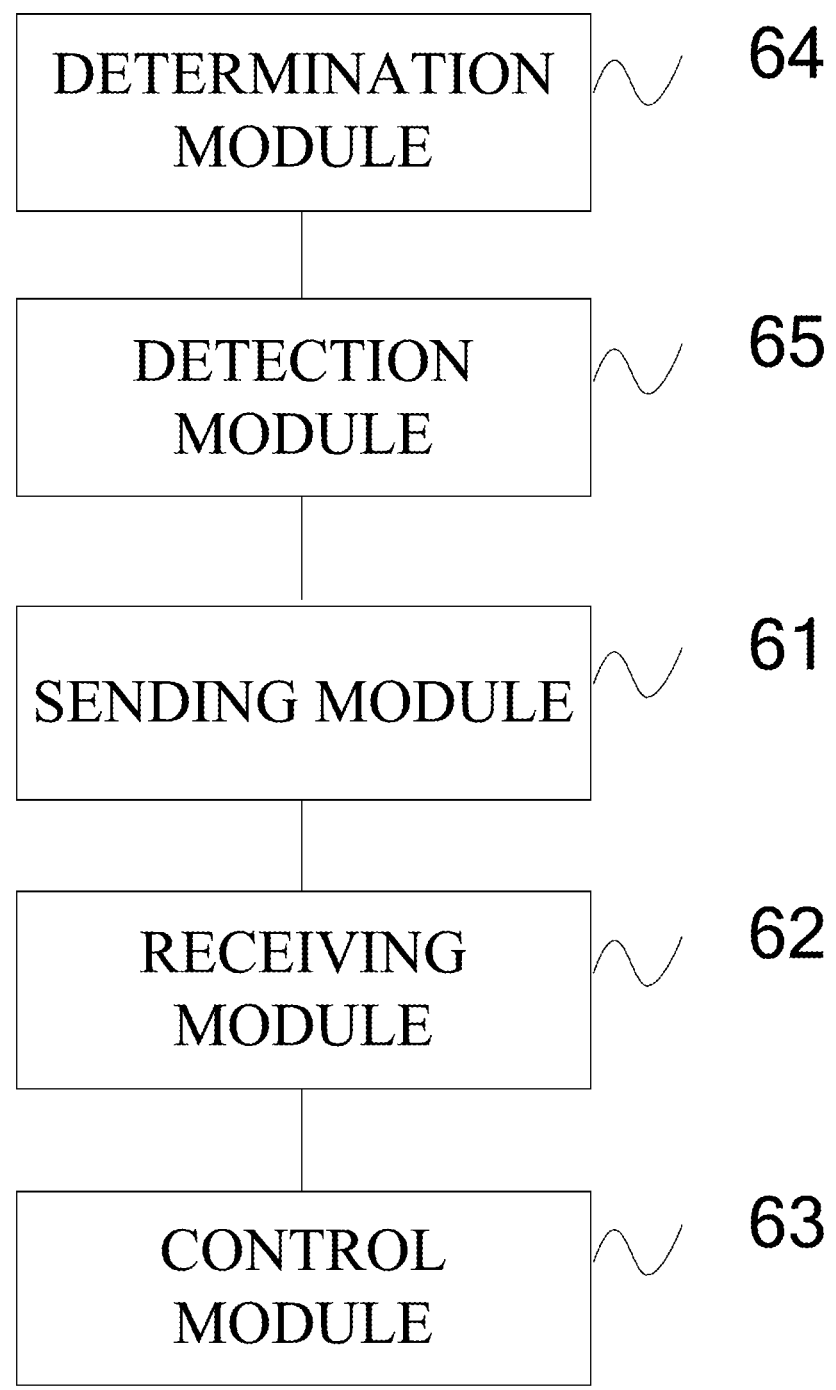
FIG. 8 is a third block diagram showing another control terminal of one or more embodiments.

As shown in FIG. 8, the control terminal may further include: a determination module 64 configured to determine a control region; and a detection module 65 configured to detect the controlled device in the control region.

Figure 9:
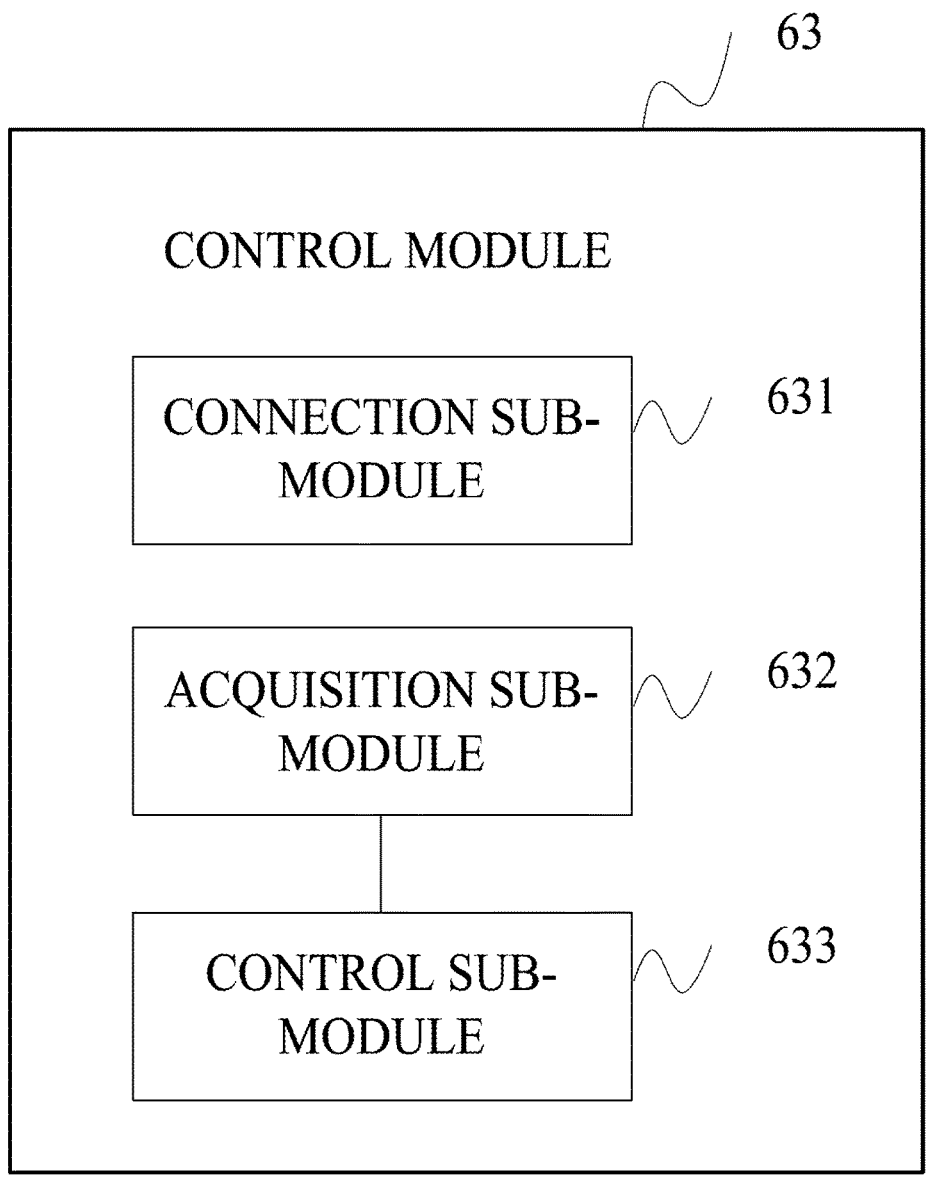
FIG. 9 is a fourth block diagram showing yet another control terminal of one or more embodiments.

As shown in FIG. 9, the control module 63 may include: an acquisition sub-module 632 configured to acquire position information and status information of the controlled device; and a control sub-module 633 configured to control the controlled device according to the position information and the status information.

The control terminal in the embodiments may be a portable device with a wireless communication function, such as a controller, a handset, a tablet computer or a wearable device.

With respect to the control terminal in the above embodiments, the specific manners for the individual modules to perform operations have been described in detail in the embodiments of the related methods and will not be elaborated herein.

According to the control terminal provided by the embodiments of the present disclosure, by sending a request for controlling the controlled device to the server, receiving a notification sent by the server after the control terminal which controls the controlled device agrees to transfer control, and connecting communicatively with the controlled device to control the controlled device after receiving the notification, control of the controlled terminal may be switched. Accordingly, the control terminal may be changed without interrupting operation of the controlled device, thereby improving the user experience.

Figure 10:
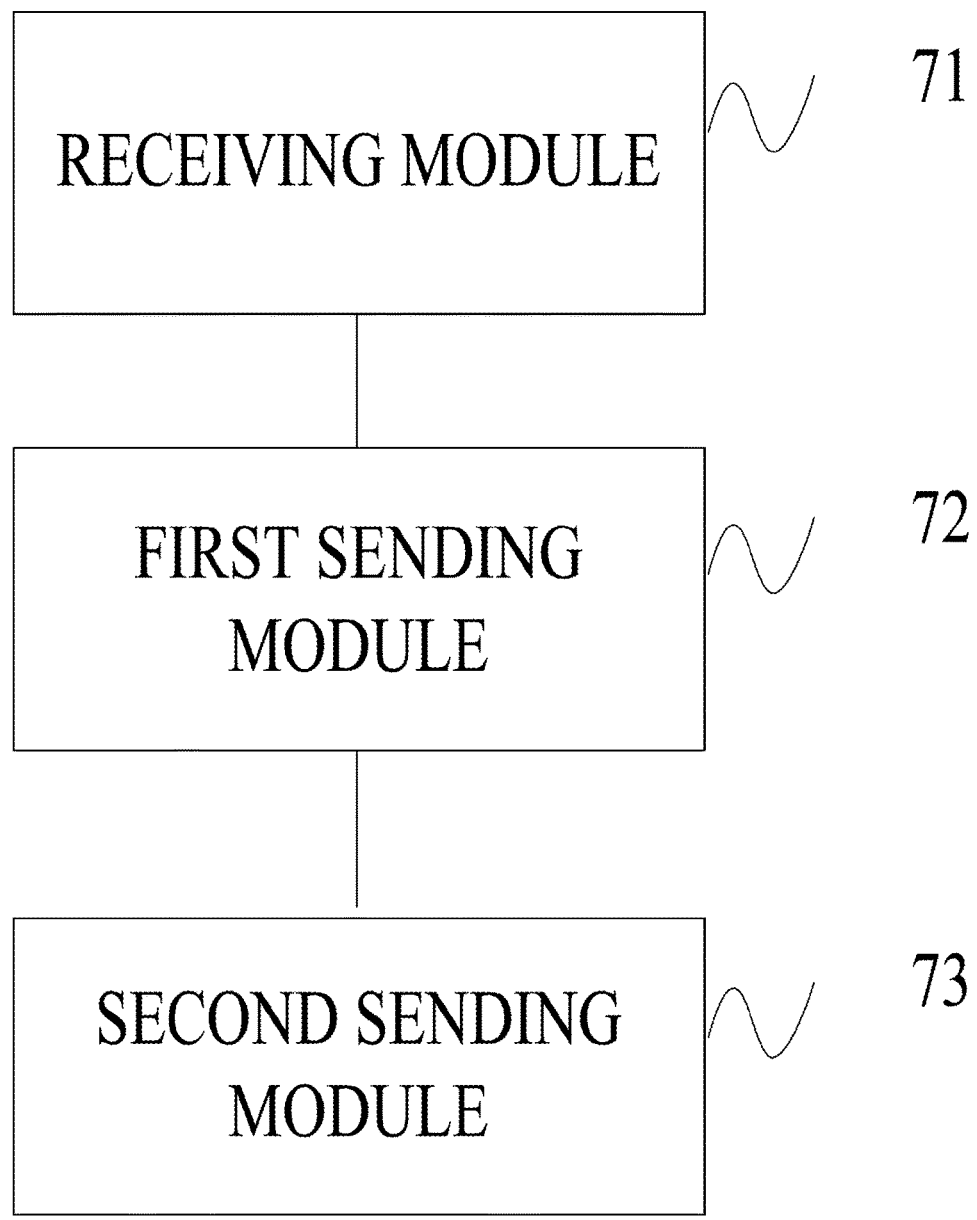
FIG. 10 is a first block diagram showing a control terminal according to one or more embodiments.

FIG. 10 shows a control terminal according to one or more embodiments. As shown in FIG. 10, the control terminal includes: a receiving module 71, a first sending module 72, and a second sending module 73.

The receiving module 71 is configured to, during a process of controlling a controlled device, receive a request, sent by a server, for transferring control of the controlled device, wherein the request for transferring control of the controlled device is sent by the server after the server receives a request, sent by a second control terminal, for controlling the controlled device.

The first sending module 72 is configured to send to the server a notification of agreeing to transfer control, so that the server notifies the second control terminal to establish a communication connection with the controlled device.

The second sending module 73 is configured to send to the controlled device an instruction of connecting with the second control terminal, so that the controlled device, after receiving the instruction, establishes a communication connection with the second control terminal and receives a control instruction sent by the second control terminal.

Figure 11:
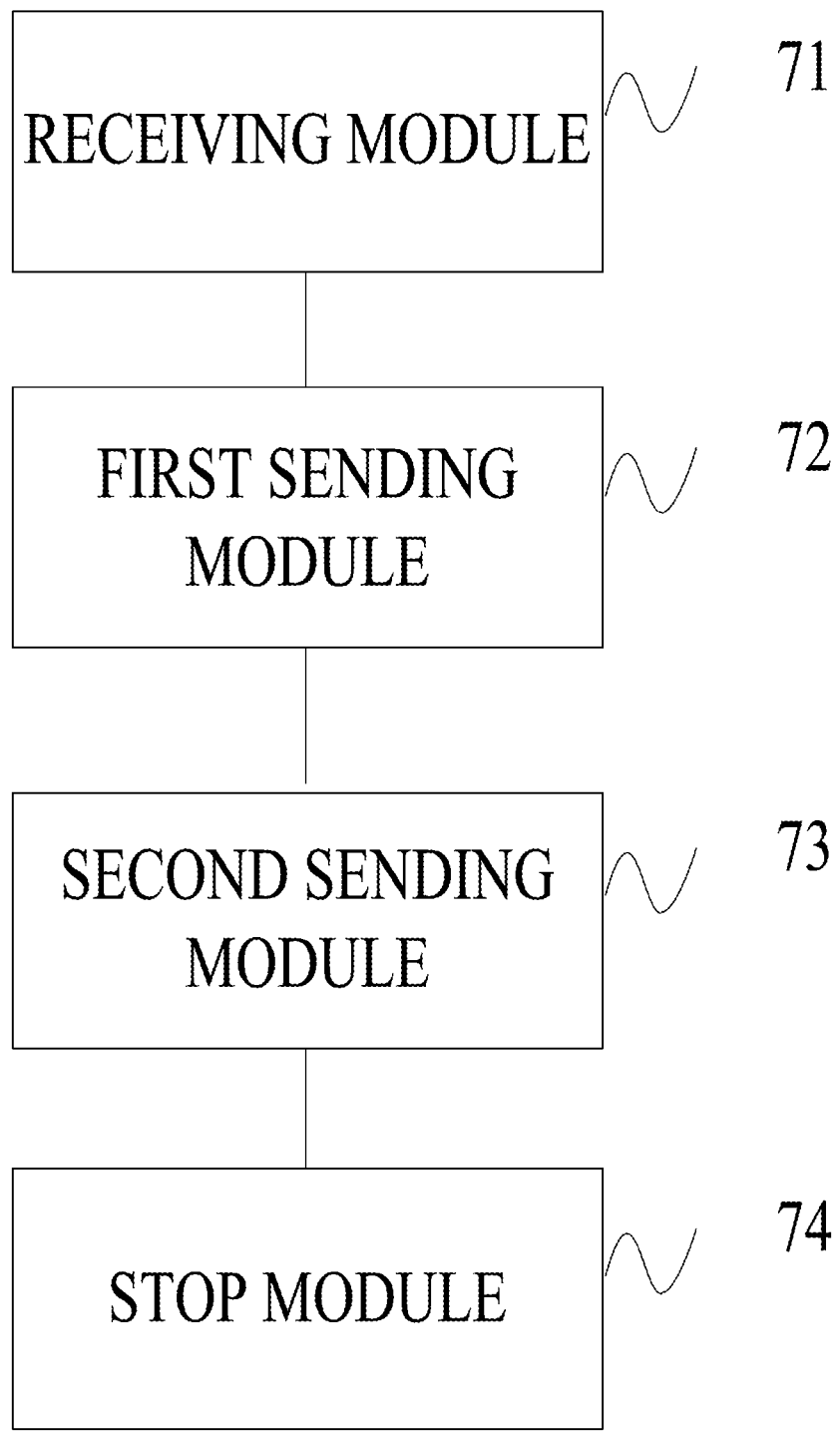
FIG. 11 is a second block diagram showing another control terminal according to one or more embodiments.

As shown in FIG. 11, the control terminal may further include: a stop module 74 configured to stop controlling the controlled device.

Figure 12:
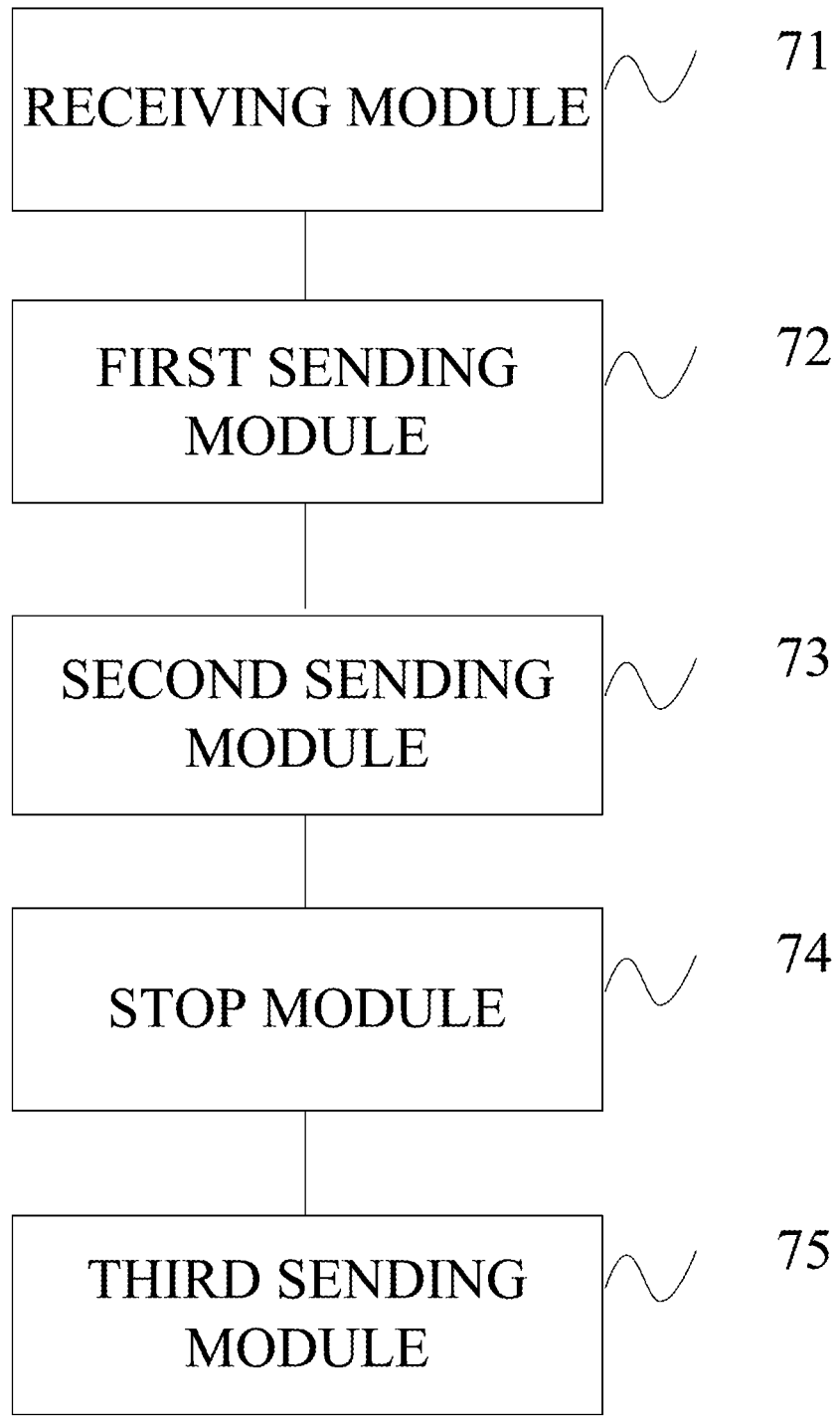
FIG. 12 is a third block diagram showing yet another control terminal according to one or more embodiments.

In an embodiment, as shown in FIG. 12, the control terminal further includes: a third sending module 75 configured to send an instruction of disconnecting the second control terminal and the controlled device from each other, so that the second control terminal and the controlled device are disconnected from each other.

In this embodiment, the control terminal may be a portable device with a wireless communication function, such as a controller, a handset, a tablet computer or a wearable device.

With respect to the control terminal in the above embodiments, the specific manners for the individual modules to perform operations have been described in detail in the embodiments of the related methods and will not be elaborated herein.

According to the control terminal provided by the embodiments, during the process of controlling the controlled device by a control terminal, the control device, in response to a request initiated by another control terminal for transferring control, sends a connection instruction to the controlled device after agreeing to transfer control. As such, a communication connection between the controlled device and the other control terminal may be established, making it convenient for the other control terminal to control the controlled device. Accordingly, the control terminal may be changed without interrupting operation of the controlled device, thereby improving the user experience.

Figure 13:
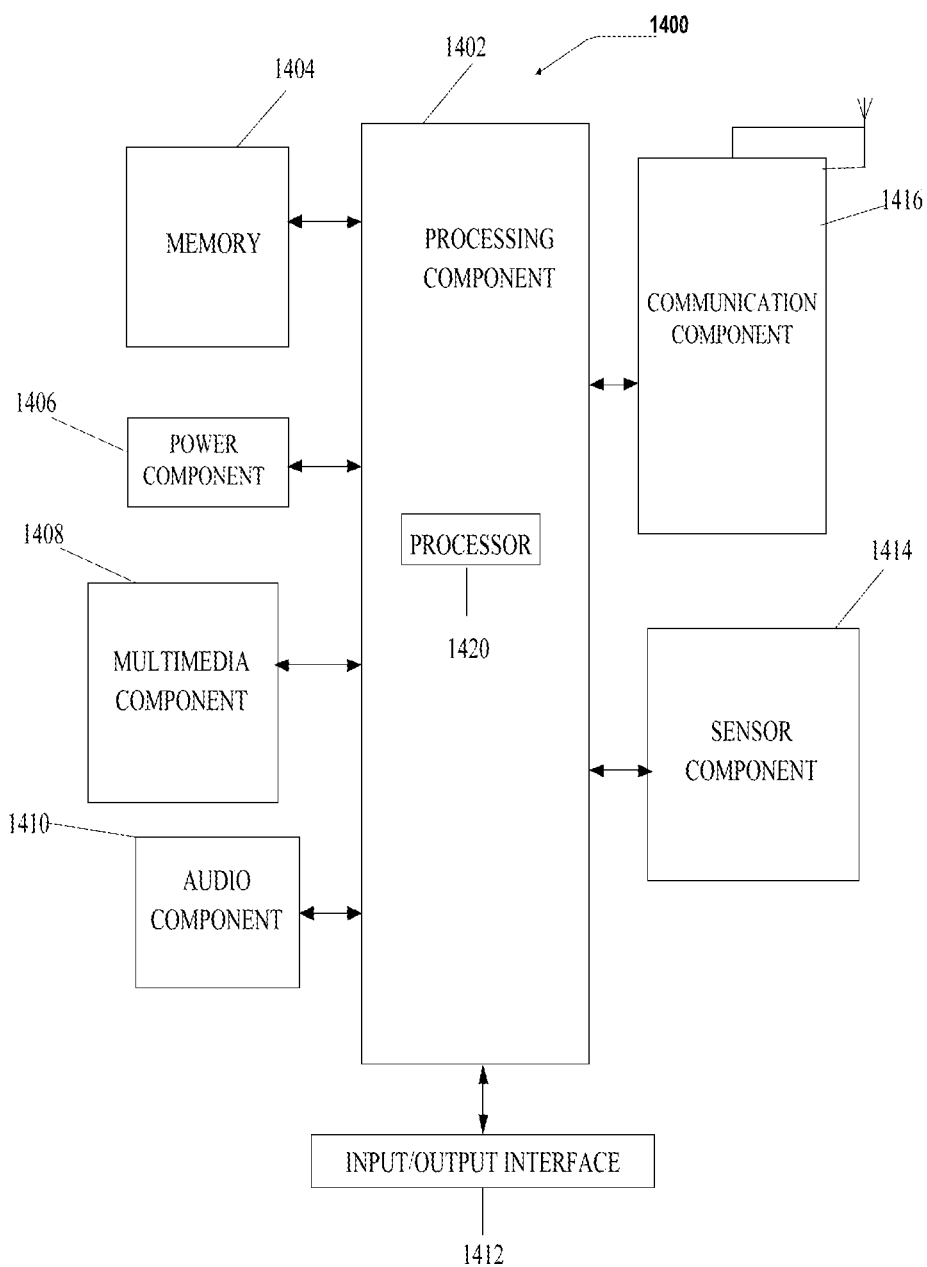
FIG. 13 is a first block diagram of a control terminal according to one or more embodiments.

FIG. 13 is a block diagram of a control terminal 1400 according to one or more embodiments. The control terminal 1400 is suitable to be used in a portable device with a wireless communication function (such as a walkie-talkie, a handset, a tablet computer or a wearable device) or in an application. For example, the control terminal 1400 may be a computer, a digital broadcast terminal, a message transceiver, a game console, a tablet device, a medical device, fitness equipment, a personal digital assistant or the like.

Referring to FIG. 13, the control terminal 1400 may comprise one or more following components: a processing component 1402, a memory 1404, a power component 1406, a multimedia component 1408, an audio component 1410, an input/output (I/O) interface 1412, a sensor component 1414 and a communication component 1416.

The processing component 1402 typically controls overall operations of the control terminal 1400, such as the operations associated with display, telephone calls, data communications, camera operations and recording operations. The processing component 1402 may include one or more processors 1420 to execute instructions to perform all or part of the steps in the above described methods. Moreover, the processing component 1402 may include one or more modules which facilitate the interaction between the processing component 1402 and other components. For example, the processing component 1402 may comprise a multimedia module to facilitate the interaction between the multimedia component 1408 and the processing component 1402.

The memory 1404 is configured to store various types of data to support the operation of the control terminal 1400. Examples of such data comprise instructions for any applications or methods operated on the control terminal 1400, contact data, phonebook data, messages, pictures, video, etc. The memory 1404 may be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the control terminal 1400. The power component 1406 may comprise a power management system, one or more power sources, and any other components associated with the generation, management, and distribution of power in the control terminal 1400.

The multimedia component 1408 includes a screen providing an output interface between the control terminal 1400 and the user. In some embodiments, the screen may comprise a liquid crystal display (LCD) and a touch panel (TP). If the screen includes the touch panel, the screen may be implemented as a touch screen to receive input signals from the user. The touch panel includes one or more touch sensors to sense touches, swipes and gestures on the touch panel.

The touch sensors may not only sense a boundary of a touch or swipe action, but also sense a period of time and a pressure associated with the touch or swipe action. In some embodiments, the multimedia component 1408 includes a front camera and/or a rear camera. The front camera and/or the rear camera may receive an external multimedia datum while the control terminal 1400 is in an operation mode, such as a photographing mode or a video mode. Each of the front and rear cameras may be a fixed optical lens system or have a focus and optical zoom capability.

The audio component 1410 is configured to output and/or input audio signals. For example, the audio component 1410 includes a microphone (MIC) configured to receive an external audio signal when the control terminal 1400 is in an operation mode, such as a call mode, a recording mode, and a voice recognition mode. The received audio signal may be further stored in the memory 1404 or transmitted via the communication component 1416. In some embodiments, the audio component 1410 further includes a speaker to output audio signals.

The I/O interface 1412 provides an interface between the processing component 1402 and peripheral interface modules, such as a keyboard, a click wheel, buttons, and the like. The buttons may comprise, but are not limited to, a home button, a volume button, a starting button, and a locking button.

The sensor component 1414 includes one or more sensors to provide status assessments of various aspects of the control terminal 1400. For instance, the sensor component 1414 may detect an open/closed status of the control terminal 1400, relative positioning of components, e.g., the display and the keypad, of the control terminal 1400, a change in position of the control terminal 1400 or a component of the control terminal 1400, a presence or absence of user's contact with the control terminal 1400, an orientation or an acceleration/deceleration of the control terminal 1400, and a change in temperature of the control terminal 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor or a temperature sensor.

The communication component 1416 is configured to facilitate communication, wired or wirelessly, between the control terminal 1400 and other devices. The control terminal 1400 can access a wireless network based on a communication standard, such as WiFi, 2G; or 3G; or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the control terminal 1400 may be implemented with one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The control terminal 1400 may use the circuitries in combination with the other hardware or software components for performing the above described methods. Each module, sub-module, unit, or sub-unit in the disclosure may be implemented at least partially using the one or more circuitries.

In exemplary embodiments, there is also provided a non-transitory computer-readable storage medium comprising instructions, such as comprised in the memory 1404, executable by the processor 1420 in the control terminal 1400, for performing the above-described methods. For example, the non-transitory computer-readable storage medium may be a ROM, a RAM, a CD-ROM, a magnetic tape, a floppy disc, an optical data storage device, and the like.

The embodiment provides a control terminal, comprising: a processor; and a memory configured to store instructions executable by the processor. The processor is configured to: send a request for controlling a controlled device to a server, wherein the server, after receiving the request, requests a first control terminal, which controls the controlled device at present, to transfer control; receive a notification, sent by the server, of agreeing to control the controlled device, wherein the notification is sent after the server determines that the first control terminal agrees to transfer control; and connecting communicatively with the controlled device to control the controlled device.

Connecting communicatively with the controlled device includes: sending a connection request to the controlled device, so that the controlled device establishes a communication connection according to the connection request after receiving a connection instruction sent by the first control terminal.

Further, before sending the request for controlling the controlled device to the server, a control region is determined, and the controlled device is detected in the control region.

Controlling the controlled device includes: acquiring position information and status information of the controlled device; and controlling the controlled device according to the position information and the status information.

Figure 14:
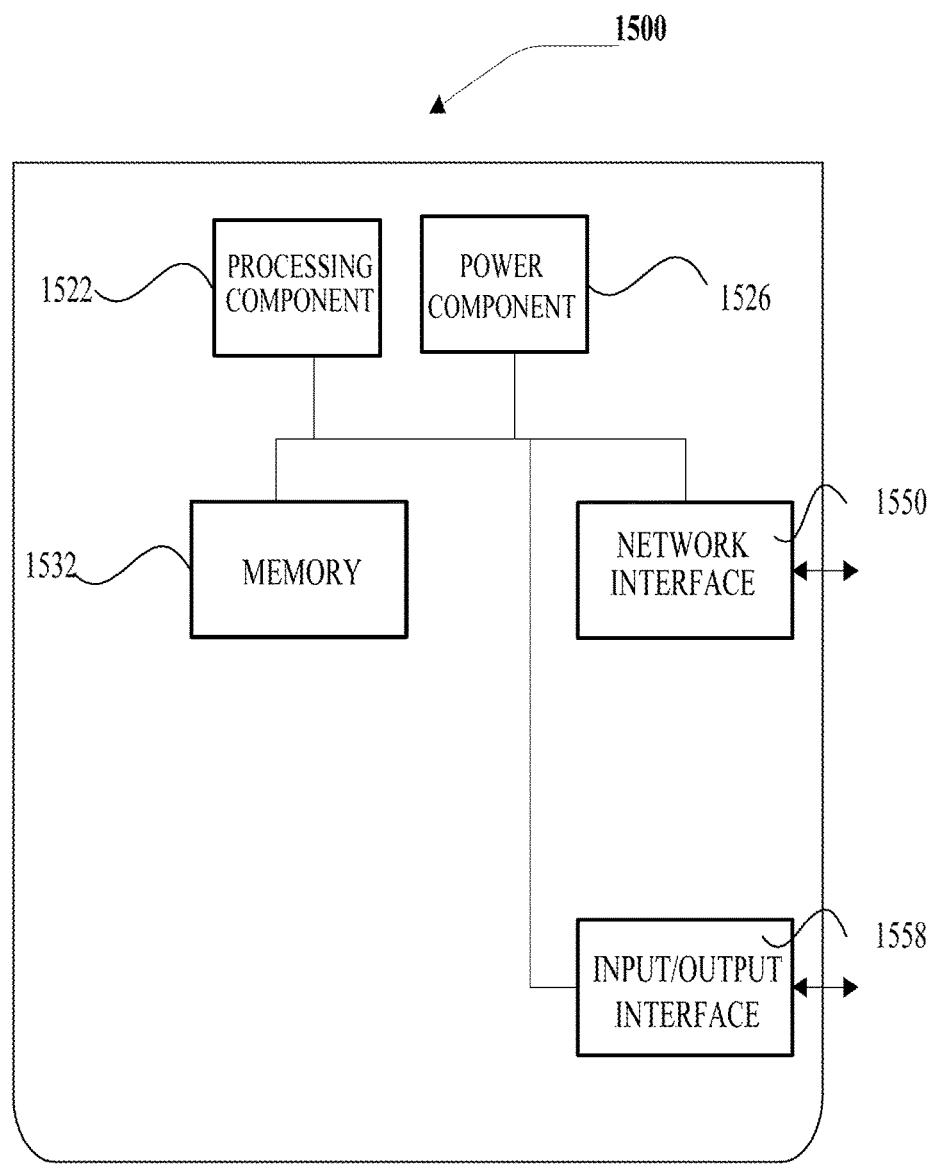
FIG. 14 is a second block diagram of a control terminal according to one or more embodiments.

FIG. 14 shows a block diagram of a control terminal 1500 according to one or more embodiments. For example, the control terminal 1500 may be provided as a computer. Referring to FIG. 14, the control terminal 1500 includes: a processing component 1522 which further includes one or more processors; and memory resources represented by a memory 1532 configured to store instructions executable by the processing component 1522, such as an application. The application stored in the memory 1532 may comprise one or more modules, each of which corresponds to a group of instructions. Besides, the processing component 1522 is configured to execute instructions so as to execute the above methods.

The control terminal 1500 may also comprise: a power component 1526 configured to perform power management for the control terminal 1500, a wired or wireless network interface 1550 configured to connect the control terminal 1000 to a network, and an input/output interface 1558. The control terminal 1500 may operate an operating system stored in the memory 1532, such as Windows Server™, Mac OS X™, Unix™, Linux™, FreeBSD™ or the like.

According to the control terminal provided by the embodiment of the present disclosure, by sending a request for controlling the controlled device to the server, receiving a notification sent by the server after the control terminal which controls the controlled device agrees to transfer control, and connecting communicatively with the controlled device to control the controlled device after receiving the notification, control of the controlled terminal may be switched. Accordingly, the control terminal may be changed without interrupting operation of the controlled device, thereby improving the user experience.

An embodiment of the present disclosure provides a control terminal suitable to be used in a portable device with a wireless communication function (such as a handset, a tablet computer or a wearable device) or in an application. For example, the control terminal may be a computer, a digital broadcast terminal, a message transceiver, a game console, a tablet device, a medical device, fitness equipment, a personal digital assistant or the like. The control terminal may adopt a composite structure shown in FIG. 13, which will not be repeated herein.

The embodiment provides a control terminal, comprising: a processor; and a memory configured to store instructions executable by the processor. The processor is configured to: during a process of controlling a controlled device, receive a request, sent by a server, for transferring control of the controlled device, wherein the request for transferring control of the controlled device is sent by the server after the server receives a request, sent by a second control terminal, for controlling the controlled device; send to the server a notification of agreeing to transfer control, so that the server notifies the second control terminal to establish a communication connection with the controlled device; and send to the controlled device an instruction of connecting with the second control terminal, so that the controlled device, after receiving the instruction, establishes a communication connection with the second control terminal and receives a control instruction sent by the second control terminal.

After sending the instruction of connecting with the second control terminal to the controlled device, control of the controlled device is stopped.

When executing the instructions, the processor may be further configured to send an instruction of disconnecting the second control terminal and the controlled device from each other, so that the second control terminal and the controlled device are disconnected from each other.

The control terminal provided by the embodiment of the present disclosure may be implemented by adopting a structure illustrated by the block diagram of FIG. 14, which will not be repeated herein.

According to the control terminal provided by the embodiment of the present disclosure, during the process of controlling the controlled device by a control terminal, the control device, in response to a request initiated by another control terminal for transferring control, sends a connection instruction to the controlled device after agreeing to transfer control. As such, a communication connection between the controlled device and the other control terminal may be established, making it convenient for the other control terminal to control the controlled device. Accordingly, the control terminal may be changed without interrupting operation of the controlled device, thereby improving the user experience.

The terminology used in the present disclosure is for the purpose of describing exemplary embodiments only and is not intended to limit the present disclosure. As used in the present disclosure and the appended claims, the singular forms "a," "an" and "the" are intended to include the plural forms as well, unless the context clearly indicates otherwise. It shall also be understood that the terms "or" and "and/or" used herein are intended to signify and include any or all possible combinations of one or more of the associated listed items, unless the context clearly indicates otherwise.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to" depending on the context.

Reference throughout this specification to "one embodiment," "an embodiment," "exemplary embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in an exemplary embodiment," or the like in the singular or plural in various places throughout this specification are not necessarily all referring to the same embodiment. Furthermore, the particular features, structures, or characteristics in one or more embodiments may be combined in any suitable manner.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for switching control, comprising:
  sending a request for controlling a controlled device to a server, wherein the request instructs the server to request a first control terminal to transfer control of the controlled device to a second control terminal, and the controlled device is determined to be in a control region after a testing signal is sent to the controlled device and a feedback signal is received;
  receiving, by the second control terminal, a notification, sent by the server, of agreeing to control the controlled device, wherein the notification is sent after the server determines that the first control terminal agrees to transfer control; and
  communicating with the controlled device to control the controlled device.

2. The method of claim 1, wherein communicating with the controlled device comprises:
  sending, by the second control terminal, a connection request to the controlled device, so that the controlled device establishes a communication connection according to the connection request after receiving a connection instruction sent by the first control terminal.

3. The method of claim 1, wherein before sending the request for controlling the controlled device to the server, the method further comprises:
- determining, by the second control terminal, the control region; and
- determining whether the controlled device is in the control region.

4. The method of claim 3, wherein determining whether the control region comprises:
- determining the control region using position information of the second control terminal and topographic information in a region that covers the control region.

5. The method of claim 1, wherein controlling the controlled device comprises:
- acquiring position information and status information of the controlled device.

6. The method of claim 5, wherein controlling the controlled device comprises:
- controlling the controlled device according to the position information and the status information.

7. A control terminal, comprising:
- a processor; and
- a memory configured to store instructions executable by the processor,
- wherein the processor is configured to:
  - send a request for controlling a controlled device to a server, wherein the request instructs the server to request a first control terminal to transfer control of the controlled device to the control terminal, and the controlled device is determined to be in a control region after a testing signal is sent to the controlled device and a feedback signal is received;
  - receive a notification, sent by the server, of agreeing to control the controlled device, wherein the notification is sent after the server determines that the first control terminal agrees to transfer control; and
  - communicate with the controlled device to control the controlled device.

8. The control terminal of claim 7, wherein the processor is further configured to:
- send a connection request to the controlled device, so that the controlled device establishes a communication connection according to the connection request after receiving a connection instruction sent by the first control terminal.

9. The control terminal of claim 7, wherein the processor is further configured to, before sending the request for controlling the controlled device to the server,
- determine the control region; and
- determine whether the controlled device is in the control region.

10. The control terminal of claim 9, wherein the processor is further configured to:
- determine the control region using position information of the control terminal and topographic information in a region that covers the control region.

11. The control terminal of claim 7, wherein the processor is further configured to:
- acquire position information and status information of the controlled device.

12. The control terminal of claim 11, wherein the processor is further configured to:
- control the controlled device according to the position information and the status information.

13. The control terminal of claim 9, wherein the processor is further configured to:
- acquire position information and status information of the controlled device; and
- control the controlled device according to the position information and the status information.

14. A non-transitory computer-readable storage medium having stored therein instructions that, when executed by a processor of a mobile terminal, causes the mobile terminal to perform acts comprising:
- sending a request for controlling a controlled device to a server, wherein the request instructs the server to request a first control terminal to transfer control of the controlled device to the mobile terminal, and the controlled device is determined to be in a control region after a testing signal is sent to the controlled device and a feedback signal is received;
- receiving a notification, sent by the server, of agreeing to control the controlled device, wherein the notification is sent after the server determines that the first control terminal agrees to transfer control; and
- communicating with the controlled device to control the controlled device.

15. The storage medium of claim 14, wherein communicating with the controlled device comprises:
- sending a connection request to the controlled device, so that the controlled device establishes a communication connection according to the connection request after receiving a connection instruction sent by the first control terminal.

16. The storage medium of claim 14, wherein before sending the request for controlling the controlled device to the server, the method further comprises:
- determining the control region; and
- determine whether the controlled device is in the control region.

17. The storage medium of claim 15, wherein the acts further comprise:
- determining the control region using position information of the control terminal and topographic information in a region that covers the control region.

18. The storage medium of claim 14, wherein controlling the controlled device comprises:
- acquiring position information and status information of the controlled device.

19. The storage medium of claim 18, wherein controlling the controlled device comprises:
- controlling the controlled device according to the position information and the status information.

20. The storage medium of claim 16, wherein controlling the controlled device comprises:
- acquiring position information and status information of the controlled device; and
- controlling the controlled device according to the position information and the status information.

* * * * *